US012736192B2

(12) United States Patent
Thompson

(10) Patent No.: US 12,736,192 B2
(45) Date of Patent: Sep. 15, 2026

(54) FLEXIBLE LIGHTING DEVICE

(71) Applicant: Dan Thompson, Irvine, CA (US)

(72) Inventor: Dan Thompson, Irvine, CA (US)

(*) Notice: Subject to any disclaimer, the term of this patent is extended or adjusted under 35 U.S.C. 154(b) by 0 days.

(21) Appl. No.: 19/271,328

(22) Filed: Jul. 16, 2025

(65) Prior Publication Data

US 2026/0022807 A1 Jan. 22, 2026

Related U.S. Application Data

(60) Provisional application No. 63/672,145, filed on Jul. 16, 2024.

(51) Int. Cl.

| | |
|---|---|
| ***F21S 4/22*** | (2016.01) |
| ***F21V 3/06*** | (2018.01) |
| ***F21V 15/015*** | (2006.01) |
| ***F21V 15/04*** | (2006.01) |
| ***F21V 23/00*** | (2015.01) |
| ***F21V 23/02*** | (2006.01) |
| ***F21V 23/06*** | (2006.01) |
| ***F21Y 115/10*** | (2016.01) |
| ***H05B 45/375*** | (2020.01) |

(52) U.S. Cl.

CPC .............. *F21S 4/22* (2016.01); *F21V 3/0625* (2018.02); *F21V 15/015* (2013.01); *F21V 15/04* (2013.01); *F21V 23/002* (2013.01); *F21V 23/02* (2013.01); *F21V 23/06* (2013.01); *H05B 45/375* (2020.01); *F21Y 2115/10* (2016.08)

(58) Field of Classification Search

CPC .......... F21S 4/00–28; F21V 3/062–062; F21V 15/01–015; F21V 15/04; F21V 23/001–06; F21Y 2103/00–37; F21Y 2115/10

See application file for complete search history.

(56) References Cited

U.S. PATENT DOCUMENTS

| | | | | |
|---|---|---|---|---|
| 6,583,550 | B2 * | 6/2003 | Iwasa | G09F 13/20 313/485 |
| 9,033,541 | B2 | 5/2015 | Porter | |
| 10,890,300 | B2 | 1/2021 | Xiong et al. | |
| 11,297,705 | B2 | 4/2022 | Miskin et al. | |
| 2004/0037079 | A1 | 2/2004 | Luk | |
| 2016/0281974 | A1 | 9/2016 | Song et al. | |

* cited by examiner

*Primary Examiner* — Jason M Han

(74) *Attorney, Agent, or Firm* — Kenneth Altshuler

(57) ABSTRACT

Disclosed is a flexible multi-layered linear LED lighting device designed for uniform radial illumination and improved mechanical durability. The device includes a flexible chip-on-board (COB) LED string mounted on a clear polymer substrate with photo-etched copper cladding, overmolded with a clear silicone coating. A light-diffusing polymer jacket surrounds the LED string and a thin-gauge electrical return wire to promote high light transmission and uniform illumination. A UV-stabilized cylindrical outer sleeve is loosely positioned over the polymer jacket to protect against abrasion and impact while maintaining axial flexibility. The lighting device further incorporates a mounting assembly comprising a molded plastic base cap and a stainless steel tension spring forming a semi-rigid bridge to a mounting end cap. Electrical power is provided via stranded input wiring terminated with a connector and regulated by an inline DC-DC buck converter configured to accept input voltages from approximately 4.0 VDC to 15 VDC.

19 Claims, 9 Drawing Sheets

FLEXIBLE LIGHTING DEVICE

CROSS-REFERENCE TO RELATED APPLICATIONS

This application is a nonprovisional patent application claiming priority to and the benefit of U.S. Provisional Patent Application Ser. No. 63/672,145 entitled Flexible Linear LED Lighting Device, filed on Jul. 16, 2024, the entire disclosure of which is hereby incorporated by reference.

FIELD OF THE INVENTION

The present embodiments are generally directed to illumination systems and, more particularly, to a flexible multi-layered linear LED lighting device for achieving uniform radial illumination along its length.

DESCRIPTION OF RELATED ART

Existing linear Light Emitting Diode (LED) lighting systems frequently encounter challenges in providing consistent, uniform radial illumination along their entire lengths while maintaining a compact form factor and sufficient resilience to physical impacts. The technical field of LED lighting and illumination broadly recognizes the difficulty of achieving an even light distribution in applications requiring both flexibility and durability.

Current approaches predominantly rely on a single or dual light source directed into a transparent tube. Such methodologies often result in high illumination levels near the source that diminish markedly with distance, creating zones of insufficient light output along the device's length. These conventional techniques also tend to limit the system's resilience and overall robustness.

The inherent drawbacks of these existing solutions include non-uniform light distribution and inadequate performance in terms of structural ruggedness. Even though various design modifications have been attempted, the fundamental issue of efficiently distributing illumination radially remains unresolved, particularly in applications demanding durability under repeated mechanical stress.

In light of these deficiencies, there exists a clear need for an improved solution capable of delivering uniform radial illumination in a compact and robust package. There is a need for a flexible multi-layered linear LED lighting device to overcome the limitations found in prior art.

SUMMARY OF THE INVENTION

The present embodiments are generally directed to a flexible multi-layered linear Light Emitting Diode (LED) lighting device.

Accordingly, certain embodiments contemplate a flexible multi-layered linear LED lighting device with uniform radial illumination. In one embodiment, the flexible multi-layered linear LED lighting device includes a flexible Chip-on-Board (COB) LED string formed on a clear flexible polymer substrate having photo-etched copper cladding, over molded with a clear silicone coating. This LED string is tightly enveloped by a polymer jacket that also surrounds a thin-gauge electrical return wire. The polymer jacket is fabricated from a light-diffusing material that transmits at least 75 percent of the light generated by the COB LEDs to promote even brightness along the device's axial length. Additionally, the structure incorporates a rigid or semi-rigid outer cylindrical sleeve or polycarbonate tube of UV stabilized polymer material that is loosely fitted over the polymer jacket; the rigid outer cylindrical sleeve is configured with an outer diameter and wall thickness specifically selected to provide mechanical protection against abrasion and impact while still allowing axial movement of the COB LED string when subjected to external forces, such as if the rigid outer cylindrical sleeve flexes, such as due to natural forces, such as wind. A mounting assembly is positioned at one longitudinal end of the device and comprises a plastic molded base cap that is electrically and mechanically coupled with the COB LED string, together with a stainless steel tension spring that forms a semi-rigid mechanical bridge between the base cap and a mounting end cap. Input wiring, which includes a pair of stranded wires for positive and negative voltage supply terminating at an input connector, is also incorporated. Optionally, a DC-DC buck regulator is integrated inline with the input wiring to step down input voltages within a range of approximately 4.0 VDC to 15 VDC to the regulated voltage required by the COB LED string.

The technical advantages provided by the features of this independent embodiment are considerable. The integration of the light diffusing polymer jacket with the COB LED string yields an even radial illumination that minimizes hotspots along the length of the device. Additionally, the layered construction, including the rigid outer sleeve and reentrant mounting assembly, ensures that the device maintains its inherent straight alignment when unperturbed while still accommodating temporary bending under external forces. This design thus achieves a unique combination of robust mechanical protection and high optical performance even in demanding physical environments.

In accordance with an embodiment of the present invention, the polymer jacket comprises a semi-transparent material selected from white or clear compositions having a hardness between about 40 Shore A and 70 Shore A. This characteristic not only enhances the light diffusion properties of the jacket but also contributes to the structural rigidity necessary for the overall assembly.

In accordance with an embodiment of the present invention, the rigid outer cylindrical sleeve exhibits a wall thickness in the range of about 0.7 mm to 1.5 mm and maintains an internal axial clearance relative to the polymer jacket of approximately 0.3 mm to 0.7 mm. Additionally, the sleeve provides abrasion protection and impact resistance while still permitting controlled axial movement of the underlying LED assembly.

In accordance with an embodiment of the present invention, the stainless steel tension spring features an outer diameter between 7.0 mm and 9.0 mm, a length between 15 mm and 22 mm, and a wire cross-section between 0.7 mm and 1.0 mm or some other diameter that can be larger or smaller. This spring functions as a semi-rigid bridge that absorbs and redistributes mechanical forces and thereby helps to protect the COB LED string and surrounding layers from damage during bending or impact.

In accordance with an embodiment of the present invention, the mounting assembly further comprises a mounting end cap having a slot-shaped configuration. This configuration includes a central cylindrical portion capped by outwardly extending flanges and incorporates an axial bore that provides a passage for the input wiring, ensuring that the wiring is not pinched or compromised during mounting.

In accordance with an embodiment of the present invention, the flexible COB LED string is fabricated on a clear polymer substrate that is approximately 0.2 mm thick and includes photo-etched copper cladding, with the chip-on-board LEDs having dimensions of approximately 1 mm by 0.5 mm. This precise construction ensures high brightness while maintaining a flexible profile suitable for diverse bending applications.

In accordance with an embodiment of the present invention, the input wiring comprises a plurality of 28-gauge stranded wires that terminate at a 2-pin connector configured to facilitate electrical connection to an external power source. The stranded wires ensure reliable power delivery while preserving the overall flexibility of the device.

In accordance with an embodiment of the present invention, the manufacturing method comprises sequential steps that include forming the flexible COB LED string, applying an over-molded clear silicone coating thereto, subsequently applying the light diffusing polymer jacket over the silicone coating, and finally enclosing the resulting assembly within the rigid outer cylindrical sleeve. These steps are performed in a manner that preserves the relative spatial positioning of the COB LED components, thereby ensuring uniform illumination and mechanical integrity.

In accordance with an embodiment of the present invention, the overall length of the flexible LED lighting device is selected from a range of approximately 50 mm to 320 mm (not to be limited by this range), with corresponding proportional adjustments in the dimensions of the COB LED string assembly and the rigid outer cylindrical sleeve. The flexibility in length allows the device to be tailored for various applications while maintaining consistent performance characteristics.

In accordance with an embodiment of the present invention, a method of operating the flexible LED lighting device comprises supplying electrical power to the COB LED string through the integrated DC-DC buck regulator configured to step down an input voltage within a range from approximately 4.0 VDC to 15 VDC to the regulated voltage necessary for enhanced performance of the COB LED string.

In accordance with an embodiment of the present invention, the mounting end cap is configured for engagement with a variety of mounting hardware, such as U brackets, flanged split screws, roll bar mounting brackets, or P clips, to provide versatile attachment options for the device in a range of installation scenarios.

DETAILED DESCRIPTION

Figure 1:
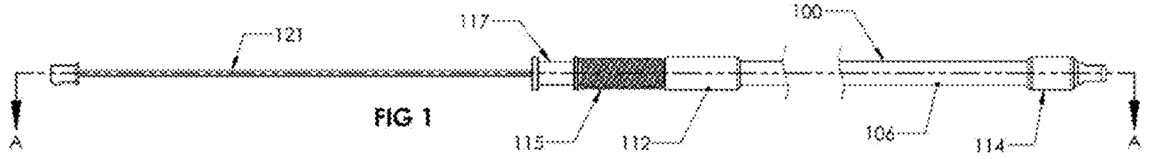
FIG. 1 illustrates the flexible linear LED lighting device in a side view perspective, consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean that the particular feature, structure, or characteristic following the phrase is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including", and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of the exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts. Further, the term "one" is synonymous with "a", which may be a first of a plurality.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Certain embodiments of the present disclosure provides a flexible multi-layered linear LED lighting device configured to produce substantially uniform radial illumination along its axial length. The device includes a flexible COB LED string formed on a clear 0.2 mm flexible polymer substrate with photo-etched copper cladding, upon which a plurality of chip-on-board LEDs are mounted. The COB LED string is encapsulated with a clear silicone over-mold that provides both protection and flexibility, resulting in a filamentary assembly that, when energized by a suitable +3 VDC supply, emits light radially to create the visual impression of an illuminated cylindrical rod. Surrounding the COB LED string is one or more light diffusing tight tight-fitting polymer jackets having wall thicknesses in the range of 0.1 mm to 0.3 mm that not only hide an embedded thin-gauge electrical return wire but also contribute to evenly distributing the light output. An outer rigid cylindrical sleeve (but able to flex when subjected to external forces, such as due to natural forces, e.g., wind) formed from a UV-stabilized polymer loosely encompasses the tight-fitting layers to provide abrasion resistance and impact protection while still permitting limited axial movement for temporary bending upon application of external lateral forces.

The flexible, multi-layered linear LED lighting device can further incorporates a mounting assembly at one longitudinal end that includes a plastic molded base cap electrically connected to the COB LED string and a stainless-steel tension spring, which forms a semi-rigid mechanical bridge to a mounting end cap. The tension spring, having an outer diameter between 7.0 mm and 9.0 mm, for example, and a predetermined length and wire cross section, serves to absorb and deflect external mechanical loads while enhancing the overall structural integrity of the device in demanding physical environments. Input wiring comprising stranded conductors terminates in an input connector and, in certain embodiments, is coupled in line with a DC-DC buck regulator configured to regulate input voltages ranging from approximately 4.0 VDC to 15 VDC to the voltage requirement of the COB LED string. The inventive construction, which allows the device to revert to its default straight configuration after removal of external forces, offers both enhanced durability and adaptability for mounting to a variety of substrates such as vehicles, display stands, or any other applications where both flexibility and resilience are required.

In some embodiments, the mounting end cap is configured for engagement with one or more mounting hardware selected from a set of U brackets, a set of flanged split screws, a set of roll bar mounting brackets, and a set of P-clips.

In some embodiments, the clear flexible polymer substrate is configured to bend at least 180 degrees around a 1 mm radius without one or more of: a mechanical failure, and an electrical failure.

In some embodiments, the associated thin-gauge electrical return wire is a 30 AWG tin-plated solid core copper wire dimensioned to carry approximately 200 mA while maintaining the flexibility and uniform illumination characteristics of the COB LED string.

In some embodiments, the polymer jacket is formed from a white semi-transparent light-diffusing material configured to transmit between 65% to 90% of light emitted by the closely spaced chip-on-board LEDs to produce a uniform radial glow, closely spaced is defined between 0.5 mm to 10 mm.

In some embodiments, the rigid outer cylindrical sleeve has a wall thickness of approximately 1 mm and an outer diameter of approximately 4.45 mm, and is configured to maintain the axial centering of the flexible COB LED string while mitigating external mechanical impact.

In some embodiments, the length of the flexible LED lighting device is selected from a range of approximately 50 mm to 320 mm, with proportional adjustments in the dimensions of the COB LED string assembly and the rigid outer cylindrical sleeve.

FIG. 1 illustrates a side view of the flexible linear LED lighting device 100, presenting the arrangement and relationships between key structural components. The polycarbonate tube 106 encapsulates the central illuminating assembly and is characterized by a 1 mm wall thickness, an outer diameter of 4.45 mm, and an internal diameter of approximately 2.45 mm, which defines a clearance, considered its axial clearance, sufficient to accommodate free axial movement of the tight-fitting polymer jacket 105 of FIG. 2 along the inner surface of the length (longitudinal dimension) of the polycarbonate tube 106 defined along its axis (represented by the A-A center-line). At one extremity, the polycarbonate tube 106 abuts a plastic endcap 114 that is configured to enclose and protect the distal solder tab of the COB LED string, thereby preventing ingress of contaminants and providing a finished appearance. At the opposing end, the main body terminates in a plastic molded base cap 112, which secures and insulates the soldered electrical connections between the COB LED string and the power input wires 121. Between base cap 112 and mounting end cap 117, a stainless-steel tension spring 115 is integrated, serving as a resilient mechanical bridge with an outer diameter dimensioned between 7.0 mm and 8.0 mm, a length in the range of 15 mm to 22 mm, and a wire cross section of 0.7 mm to 1.0 mm.

In one embodiment of the present invention, the polycarbonate tube 106 is fabricated from UV-stabilized polycarbonate material (or another suitable polymer known to those skilled in the art), selected for its high optical transmittance, chemical resistance, and rigidity. The structural attributes of the tube, such as its thickness and dimensional tolerances, facilitate the protective enclosure of the internal flexible lighting assembly while ensuring the device remains straight when unencumbered by external forces. This rigidity, combined with the inherent flexibility of the underlying COB LED string, defines the device's ability to maintain a linear form in regular use yet temporarily yield to lateral deformation (ability to flex) when subjected to mechanical stresses. The loose internal clearance allows the central lighting assembly to flex independently of the rigid outer shell, with the tube ameliorating impacts and abrasion encountered in harsh environments. Hence, when used herein, the rigid outer cylindrical sleeve/polycarbonate tube 106 is actually a semi-rigid tube that retains its shape but with the ability to flex and spring under external forces, such as wind, manipulation or impact.

Additionally, the stainless-steel tension spring 115 is coaxially aligned with the polycarbonate tube 106 and base cap 112. The spring is dimensioned to retain semi-rigidity while allowing controlled flexure, effectively bridging the mechanical gap between the device body and the mounting end cap 117. This arrangement absorbs and disperses impact energy to prevent transfer of damaging loads to the more delicate LED and wiring assemblies housed within the main body. The mounting end cap 117 acts as the interface for mounting the device to third-party structures, such as radio-controlled vehicles or display stands. The interaction between the tension spring and the adjoining caps enables repeated flexing during operational use without compromising the mechanical or electrical integrity of the device.

In another embodiment of the invention, the base cap 112 is constructed via injection molding with a polymer compound chosen for electrical insulation and environmental sealing. The base cap 112 is internally configured to support and orient the solder terminals of the COB LED string, while also acting as an anchoring point for the incoming power wires 121. The arrangement of these components ensures that electrical connectivity is robust and that the system is safeguarded from mechanical stress at points of ingress and egress. The optional inclusion of potting compounds or resilient gaskets at the base cap 112 further enhances resilience to moisture, dust, and vibration.

A further embodiment includes variations in the design and materials utilized for the endcap 114, which may comprise translucent or opaque polymers to meet cosmetic or protective requirements. The endcap 114 may be press fit or adhesively secured to the polycarbonate tube 106, and, in some versions, may be removable to permit servicing, replacement, or modification of the internal components. The arrangement as illustrated in FIG. 1 provides a robust, modular platform for a flexible linear LED lighting device that is suited to a wide array of demanding applications, where reliable uniform illumination and mechanical survivability are of paramount importance.

Figure 2:
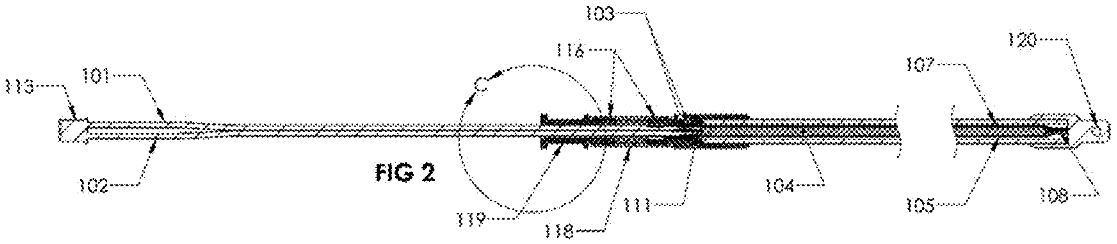
FIG. 2 illustrates a section view showing a 28-stranded core wire carrying positive voltage and a 28-gauge stranded core wire carrying negative voltage, consistent with embodiments of the present invention.

FIG. 2 illustrates a sectional view of a flexible linear LED lighting device 100, detailing the internal assembly and electrical pathway from the power input to the illuminating flexible COB LED string 104. The illustration highlights a pair of stranded conductors, specifically a 28-stranded core wire 101 designated for positive voltage and a 28-gauge stranded core wire 102 designated for negative voltage. Both wires terminate at one end in a 2-pin, 2 mm JST connector 113, which facilitates convenient external connection to power sources or ancillary circuitry. The opposing ends of wires 101 and 102 are soldered at solder connections 103, interfacing with both the positive solder lead 111 of the COB LED string 104 and a negative voltage return wire 107 to establish the necessary electrical continuity for device operation.

The flexible COB LED string 104 resides within the device as a continuous, bendable assembly of 1×0.5 mm chip-on-board LEDs mounted on a clear polymer substrate suitable for both flexibility and durability. The over-molded silicone coating envelops the entire substrate, ensuring environmental protection and maintaining a cylindrical form factor. The electrical return wire 107 is implemented as a light-gauge, 30 AWG tin-plated solid core copper wire, routed longitudinally along the COB LED string 104 and physically connected at connection point 108 to the negative terminal of the LED assembly. This configuration allows both input voltage and return lines to be conveniently accessed from the same end of the device, supporting streamlined installation and assembly.

Encasing the arrangement of the COB LED string 104 and return wire 107 is a tight-fitting polymer jacket 105 that tightly encloses the flexible COB LED sting 104. The jacket 105 is configured in certain embodiments to be transparent, or in alternative embodiments to be colored white with semi-transparency, transmitting between 65% to 90% of emitted light, thus functioning as both a protective barrier and as a light-diffusing medium. The tight adherence of jacket 105 to the assembly provides not only environmental protection and mechanical stabilization but also enhances the uniform distribution of optical output along the device length by reducing local intensity variations occurring between adjacent LEDs. The outer boundary of the section is defined by the polycarbonate outer tube 106, illustrated in context for dimensional and positional reference but not emphasized further in this sectional drawing.

In one embodiment of the invention, the solder connections 103 between wires 101 and 102 and the positive/negative terminals of the COB LED string 104 are mechanically reinforced and insulated using a combination of thermoset encapsulants and heat-shrink tubing to prevent inadvertent shorting and to withstand repeated flexural stresses. The close coupling of the return wire 107 with the LED substrate ensures minimal impact on the flexibility of the device and avoids obstruction of radial light emission, preserving both performance and visual uniformity.

Additionally, the arrangement is terminated at the distal end by an end feature 120, which may comprise a plastic insert or cap configured to maintain axial placement of the jacket 105 and to protect the electrical termination of the return wire 107. Where required, the end feature may be constructed with additional grommets or sealing elements to enhance ingress protection. The region identified as 119 and 118 in proximity to the soldering point serves to position and anchor the wire terminations, which may be molded or cast directly as part of the base cap assembly for greater assembly robustness.

In another embodiment of the invention, the tight-fitting polymer jacket 105 is formed from an extruded thermoplastic elastomer possessing a tailored hardness in the range of 40-Shore A to 70-Shore A, with additives for UV stability or enhanced weather resistance as necessary for the intended application environment. The material selection, thickness, and translucency of the jacket 105 are interdisciplinary variables that determine the trade-off between mechanical rigidity and light-diffusion characteristics. Alternative manufacturing methodologies for jacket 105 may include co-extrusion with embedded pigments to further tailor aesthetic and optical properties.

Further embodiments contemplate positional or functional variations of return wire 107. In some applications, the negative voltage return circuit may be laminated directly within the flexible substrate of COB LED string 104, allowing the return wire 107 to be omitted, as per alternate circuit designs referenced elsewhere. In scenarios where the jacket 105 is colored or patterned, the internal arrangement facilitates cosmetic customization without affecting device optical performance or flexibility. The sectional view as depicted in FIG. 2 provides a clear presentation of the key interconnections and layered construction that collectively produce reliable, robust, and uniform illumination performance characteristic of the flexible linear LED lighting device described herein.

Figure 3:
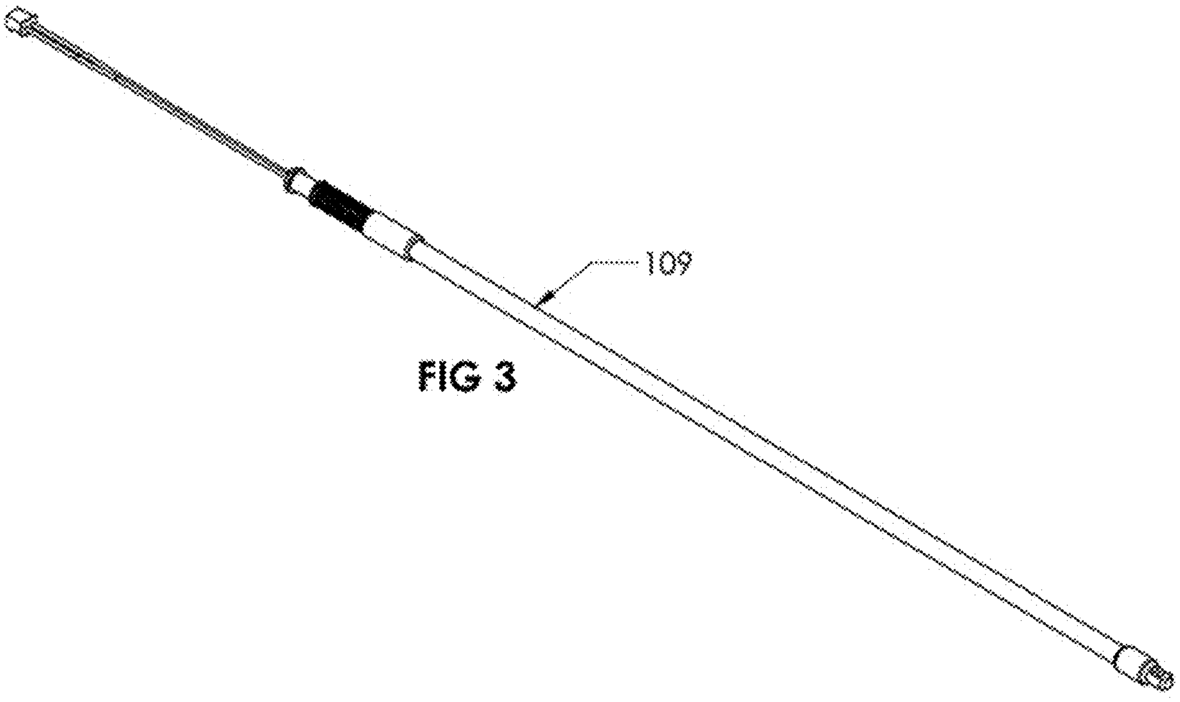
FIG. 3 illustrates the flexible linear LED lighting device in its default straight state, consistent with embodiments of the present invention.

FIG. 3 illustrates the flexible linear LED lighting device 100 in its default straight state 109, wherein the entire assembly is unbent and extends linearly along a common axis. In this state, each structural component from the polycarbonate tube 106 encasing the inner light-emitting assembly, to the distal end caps and intermediate mounting and spring structures, remains axially aligned. The default straight state 109 is inherent to the geometric and material design of the device, resulting from the combined properties of the rigid outer sleeve, tight-fitting flexible jackets, and the semi-rigid support provided by the stainless steel spring and mounting hardware at either end.

In one embodiment of the invention, the default straightness of the device 100 is achieved by careful balancing of the mechanical properties of the polycarbonate tube 106, the underlying tight-fitting polymer jacket 105, and the flexible COB LED string 104 within. The polycarbonate tube 106, while rigid enough to maintain the linear arrangement in the absence of external loads, is not so inflexible as to prevent temporary deformation. The tight-fitting polymer jacket 105 further contributes to the axial stability by gripping the COB LED string 104 and exerting a constraining influence, ensuring that the inner lighting assembly remains centered and supported within the longitudinal passage of the polycarbonate tube 106. The multi-layered assembly may be designed such that the flexural modulus of each material is tuned to cooperate across the entire length, accommodating tension and compression while favoring restoration to the default straight state when external forces are released.

Additionally, the default state illustrated in FIG. 3 implicates the role of the stainless steel tension spring 115 and mounting structures (Base Cap 112 and mounting end cap 117 in previous figures) in preserving the device's straight geometry through their mechanical compliance and resilience. These end structures may act as boundaries that not only transfer mechanical loads, should the device be forcefully bent or impacted, but also return the assembly to its original configuration due to the spring's energy-storing capabilities. This design ensures that any deviation caused by temporary constraint or force application does not result in permanent deformation or compromise illumination continuity.

In another embodiment of the invention, the default straight state 109 is also preserved through the integration of additional features such as internal alignment rods or embedded memory-shape materials within the tight-fitting jacket or polycarbonate tube. Such modifications may further enhance the device's ability to revert to the straight configuration even after repeated, cyclical application of bending loads. Manufacturing tolerances for each element, particularly the clearance between the inner jacket and outer rigid sleeve, are precisely controlled to avoid unwanted drift, sag, or lateral deformation in the absence of external forces.

The illustrated default configuration is critical to the reliability and uniformity of the flexible linear LED lighting device across applications demanding high endurance and repeatability. In accordance with the present invention, the ability to maintain and restore straightness without compromising functionality is essential for use cases including mounting to vehicles, display units, or installations subject to vibration, flexing, and mechanical impacts, ensuring both consistent visual output and mechanical durability. Variations in overall length, internal jacket translucency, or external sleeve thickness may be implemented without departing from the underlying principle of automatic return to the default straight state as depicted by 109.

Figure 4:
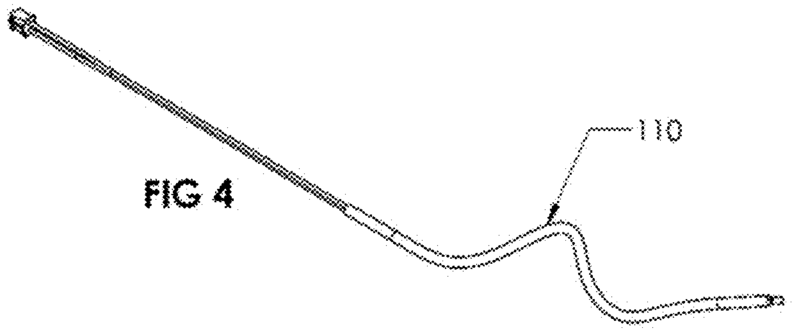
FIG. 4 illustrates the COB LED string in its default state, bent into a three-dimensional contour with constraints in place, consistent with embodiments of the present invention.

FIG. 4 illustrates the COB LED string 104 in a deformed or contoured state, wherein external constraints 110 are present to induce a non-linear configuration. The COB LED string 104, typically residing within the multi-layered assembly of the flexible linear LED lighting device 100, is shown here temporarily assuming a three-dimensional bent shape in response to applied forces or positional constraints. The illustration demonstrates the high degree of flexibility and compliance engineered into the COB LED string 104, which permits the core lighting element to follow complex or curved trajectories without mechanical failure or loss of optoelectronic function. The constraints 110 may include manual bending, installation over uneven surfaces, interaction with mounting hardware, or contact with external objects, any of which can result in the depicted deformation.

In one embodiment of the invention, the flexible COB LED string 104 is constructed from a substrate and encapsulation system arranged for multi-axis bendability. The combination of a thin polymer substrate, photo-etched conductive tracks, and low-durometer silicone coating imparts a minimal bending radius capability, allowing the element to be contorted to significant angles or radii, including the three-dimensional curves depicted in FIG. 4. The absence or minimization of rigid reinforcing elements within the COB LED string 104, combined with the carefully selected cross-sectional geometry, ensures that flexural stresses are distributed, thus mitigating fatigue and extending operational lifespan when subjected to repeated deformation.

Additionally, the presence of the constraint 110, whether originating from the mounting context, an installed accessory, or an environmental obstacle, does not compromise the internal electrical pathways along the COB LED string 104. The design of the conductor layout and selection of solder joints, particularly for the return wire 107 (referenced in earlier figures), permits uninterrupted electrical continuity even under pronounced bending. The encapsulating tight-fitting polymer jacket 105, which is not individually depicted in this figure, may, in one embodiment, further enhance stress distribution and protect against delamination or microcracking within the substrate as the COB LED string 104 is deformed.

In another embodiment of the present invention, the deformed state illustrated in FIG. 4 may be utilized for customized installation scenarios requiring the flexible linear LED lighting device 100 to conform to irregular mounting paths, decorative patterns, or three-dimensional contours on vehicles, architectural surfaces, or display fixtures. The core COB LED string 104 retains its full illumination capability in these states, owing to the radial light emission characteristics of the chip-on-board arrangement and the diffusing effect provided by subsequent encapsulating layers. The ability to conform to various installation geometries, while reverting to a straight configuration in the absence of sustained constraints, affords versatility for field deployment across a range of demanding applications.

The impact of repeated cycling between straight and deformed states is further mitigated by the selection of fatigue-resistant materials in the construction of the COB LED string 104 and the associated electrical interconnections. Embodiments may include further reinforcement at solder junctions or adoption of fatigue-tolerant conductors, which are inherently suited for environments where frequent bending and dynamic loading are expected. The combination of three-dimensional flexibility, electrical robustness, and resilient shape recovery, as illustrated, ensures the device maintains uniform optical output and mechanical performance over prolonged operational periods, addressing shortcomings of prior linear LED solutions that are prone to breakage or permanent set upon bending.

Various modifications to constraint 110 and the degree of bending possible without damage are contemplated within the invention. For example, alternate formulations of the encapsulating silicone or the use of flexible substrates with anisotropic modulus properties may yield variations in maximum permissible deformation, further tailoring the inventive aspects for specific use environments. In accordance with yet another embodiment of the present invention, reinforcement features may be selectively added at intervals along the COB LED string 104 to locally define areas of augmented flexibility or rigidity, thereby enabling the device to be pre-formed into elaborate shapes or to maintain temporary contours in response to more substantial or persistent applied constraints.

Figure 5:
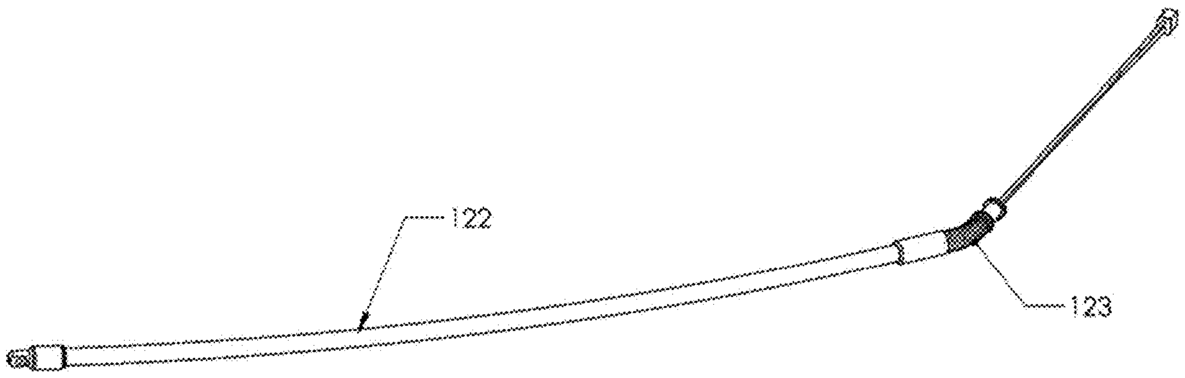
FIG. 5 illustrates the flexible linear LED lighting device with an external load applied, demonstrating bending, consistent with embodiments of the present invention.

FIG. 5 illustrates the flexible linear LED lighting device 100 in a bent configuration under the influence of an external load, highlighting the interaction between the device's semi-rigid components and the resilience facilitated by its layered construction. The illustration depicts the polycarbonate tube 122, which is semi-rigid, deflected along its length and the stainless steel tension spring 123 in a state of flexure. The primary body of the device, surrounded by the polycarbonate tube 122, presents a smooth, arced deformation, while localized bending is evident at the location of the tension spring 123. This configuration demonstrates the ability of the device to tolerate significant lateral displacement while preserving axial integrity and structural cohesion.

The polycarbonate tube 122, formed from a semi-rigid, optically transparent polymer, extends axially and is dimensioned to loosely encompass the assembly of the core lighting element and its tight-fitting jackets. The deflection observed in tube 122 occurs along the extended length, manifesting a bend of up to 35 degrees, which is facilitated by both the flexibility of the internal core and the deliberate clearance between the core and the tube's inner wall. The tube's rigidity is precisely calibrated, with its wall thickness, outer and inner diameters, and material selection to distribute applied mechanical loads uniformly along its length, avoiding any permanent set or structural compromise upon repeated cycles of bending and restoration.

The stainless steel tension spring 123, shown in a flexed state, serves as a localized pivot and energy-absorbing member. Its coiled geometry and spring constant are designed to deform elastically under load, effectively shielding the portion of the device nearest the mounting interface from excessive stress and helping prevent damage to the more delicate connections and encapsulated electrical assemblies. The spring's mechanical properties are further improved by selection of coil diameter, pitch, and wire cross section, enabling the device to continually absorb, dampen, and recover from impacts encountered during use in high-vibration or physically demanding environments.

In one embodiment of the invention, the device's ability to undergo controlled bending, as depicted in FIG. 5, is a direct result of the multi-layered architecture. The flexible COB LED string with its tight-fitting polymer jacket and encasing polycarbonate tube collectively act as a composite beam system, where the internal elements contribute flexibility and resilience, and the rigid outer layer confines the deformation to a smooth, controlled arc. The presence of the tension spring 123, bridging the transition between the device body and the mounting assembly, ensures that localized stresses are diverted away from the electrical and optoelectronic components during high to maximum deflection. The result is a lighting device that is configured and adapted for repeatedly returning to its default straight state without experiencing fatigue failure, microcracking, or other forms of permanent deformation.

Additionally, the operational characteristics of the device, as shown, are well-suited to applications in which repeated or unpredictable deflection may occur, such as on mobile platforms, vehicles, or public installations. The spring 123 maintains mechanical compliance even when subject to torsion and lateral forces, thus imparting a self-righting behavior to the assembly upon removal of the external load. Variation in the coil geometry or selection of alternative resilient materials for the spring portion, known to those skilled in the art, may be made in accordance with specific environmental or operational requirements, such as increased durability for outdoor installations or modified spring constants for applications demanding higher compliance.

In another embodiment of the present invention, the extent and location of device bending may be further tailored by adjusting the spatial relationship between the spring 123 and the polycarbonate tube 122, or by selectively reinforcing portions of the tube with thickened wall segments or additional sleeves. The use of different polymers, composite materials, or blended elastomers for the polycarbonate tube 122 enables additional customization of bending modulus, optical characteristics, or chemical resistance, expanding the range of practical applications for the illuminated device. The cumulative effect of these adaptations, as visualized in FIG. 5, is to provide a robust, versatile lighting system that preserves both mechanical resilience and uniform radiant output under a variety of loading and installation conditions. Similar suppressive and self-restoring properties may be engineered into devices of varying length, diameter, or modular construction, all within the scope of the invention as described.

Figure 6:
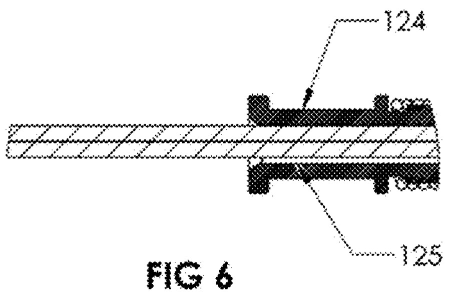
FIG. 6 illustrates key details of the mounting end cap, including the slot shape, consistent with embodiments of the present invention.

FIG. 6 illustrates a longitudinal cross-sectional view of the mounting end cap 117, detailing its key interfacing and slot features, which facilitate attachment to external mounting hardware. The mounting end cap 117 incorporates a slot-shaped feature 124, prominently formed along the exterior circumference, and a structural rib or retention element 125 positioned to engage the polycarbonate tube 106 and adjacent subassemblies. The slot 124 is dimensioned as a transverse groove or channel, the width and depth of which are set to accommodate mechanical engagement with a diverse variety of mounting brackets or clip systems, supporting both secure fixation and rotational restraint relative to a support surface. The cross-sectional geometry of the mounting end cap 117 is such that the coaxial alignment with the internal polycarbonate tube 106 is maintained, with the internal bore of the end cap tightly receiving the outer diameter of the tube without excess clearance, thereby ensuring concentricity and structural integrity.

The rib or retention structure 125 within the mounting end cap 117 is strategically located to act as a mechanical stop for the polycarbonate tube 106 and to facilitate load transfer from external forces acting on the mounting bracket to the robust outer sleeve, rather than the more delicate internal lighting assemblies. This internal rib may also function as an anti-extraction feature, limiting axial movement so that the main lighting assembly cannot be inadvertently withdrawn from its intended position during installation or while subjected to vibration or impact. The interlocking nature between the polycarbonate tube 106 and the rib 125 enhances resistance to torque and bending when external mounting hardware is anchored within slot 124.

In one embodiment of the invention, the slot-shaped feature 124 may be configured with chamfered or rounded edges to promote compatibility with a wide array of standardized mounting provisions, such as U-brackets, flanged split screws, or flange clips, referenced elsewhere in the present disclosure. This universal approach allows the flexible linear LED lighting device 100 to be rapidly adapted to different mounting scenarios by simple substitution of a compatible mounting element. The mounting end cap 117 may be manufactured by precision molding techniques utilizing toughened polymeric materials such as reinforced polycarbonate, ABS, or glass fiber-filled nylon to provide a robust, impact-resistant terminal fitting capable of withstanding repeated installation and removal cycles as well as direct mechanical loads.

Additionally, the cross-sectional passage extending coaxially through the mounting end cap 117 is designed to allow the uninterrupted passage of the power wires 101 and 102 running from the device body through to their termination points outside the mounting base. This axial through-hole is dimensioned to avoid pinching or abrasion of the wires and may optionally incorporate strain relief grooves, grommets, or molded-in flexible bushings to ensure that electrical connections remain reliably insulated and mechanically decoupled from mounting stresses. The ability to route conductive leads through the mounting terminus without interference supports various orientations of installation and enhances assembly flexibility for end users.

In another embodiment of the present invention, the slot shape 124 is supplemented by a textured or serrated surface along its base or sidewalls to offer enhanced frictional engagement with metallic or polymeric mounting jaws, reducing the likelihood of slippage under vibrational excitation. The mounting end cap 117 may also be further adapted with auxiliary features such as indexing notches or keyed surfaces permitting positive location for mounting brackets that are intended to lock the light in a predetermined angular orientation. Such variations, while not depicted in FIG. 6, fall within the scope of architecture implied by the presence of the slot structure 124, allowing for both repeatable and tool-less attachment and detachment.

Various configurations of the mounting end cap 117 and slot 124 are contemplated within the inventive scope to accommodate differing requirements across industrial, vehicular, or architectural installation environments. Some embodiments may utilize an end cap manufactured from a transparent or translucent polymer to permit illumination fully to the device tip for cosmetic or signaling purposes, while others may introduce integrated gaskets, sealing flanges, or locking tabs to ensure environmental sealing or tamper resistance. These enhancements collectively extend the versatility, reliability, and ease of installation of the flexible linear LED lighting device 100, providing secure and adaptive end-of-line termination and mounting functionality as exemplified by the embodiment presented in FIG. 6.

Figure 7:
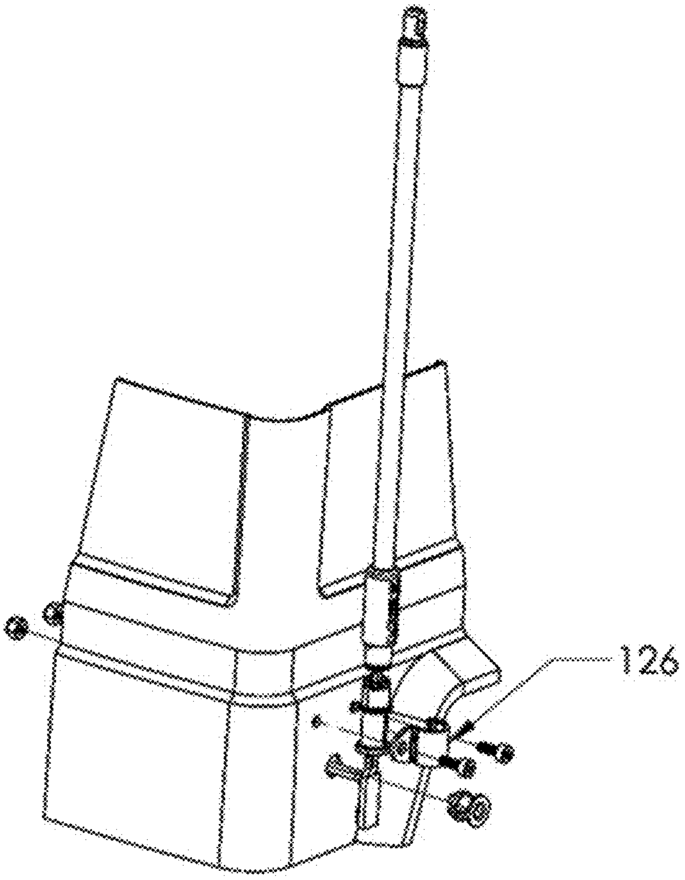
FIG. 7 illustrates a method for mounting the flexible linear LED lighting device to a vertical surface using a U-bracket that fits into the slot feature of the mounting end cap, consistent with embodiments of the present invention.

FIG. 7 illustrates a method for mounting the flexible linear LED lighting device 100 to a vertical surface using a U-bracket 126. The U-bracket 126 is shaped to fit into the slot feature 124 portion of the mounting end cap 117, which has been previously described as adapted to accept various mounting provisions. When inserted into slot 124 of the mounting end cap 117, the U-bracket 126 secures the device to a vertical substrate or panel, enabling firm retention and resisting both axial and rotational displacement.

The U-bracket 126 is typically constructed from a robust material such as stainless steel or reinforced polymer to provide adequate rigidity and long-term durability under repeated use. The bracket's two legs are dimensioned to closely match the width of the slot 124, ensuring a snug fit that prevents play or wobbling while still permitting intentional removal or repositioning if needed. Fastening hardware such as machine screws and nuts, depicted adjacent to the vertical substrate in FIG. 7, may be used to attach the U-bracket 126 securely to the supporting surface. The vertical orientation of the flexible linear LED lighting device 100 is maintained by the engagement of the U-bracket's saddle with the slot 124, while the rest of the light assembly remains unencumbered and free to flex or absorb impact loads through the compliance of its internal spring and polymeric layers.

In one embodiment of the invention, the U-bracket 126 may be manufactured with radiused inner corners or integrally molded cushioning pads in the contact zones to reduce the risk of abrasion or localized stress concentrations at the mounting interface. The design may also incorporate multiple through-holes or elongated slots for mounting hardware, thereby permitting a degree of adjustability in vertical alignment or standoff distance between the flexible linear LED lighting device 100 and the supporting panel. The slot feature 124 of the mounting end cap 117 provides positive retention such that movement of the device is restrained in all translational axes while allowing for user-defined orientation about the device's principal axis.

Additionally, in accordance with yet another embodiment, multiple U-bracket 126 elements may be employed along the device length to support applications requiring intermediate mounting points, such as mounting to tall vertical surfaces or to maintain a specified curve or fixed form factor. The use of more than one bracket may enhance axial stability and enable distributed loading, which is particularly advantageous in high-vibration installations or locations subject to external forces, such as mobile machinery or kinetic exhibits. The flexibility of the device, supported at appropriately spaced intervals, is preserved due to the compliant nature of the spring and layered construction, thus retaining the invention's key property of bouncing back to a default straight configuration upon removal of force.

The mounting method depicted in FIG. 7 is also well-suited to field installations, where rapid attachment and detachment are desired. The U-bracket 126 may be equipped with quick-release fasteners or snap-fit features to facilitate tool-less installation and expedited servicing or replacement of the flexible linear LED lighting device 100. In another embodiment, the bracket may be treated or coated to provide additional corrosion resistance or electrical insulation, depending on environmental or safety requirements.

Alternative embodiments permit the shape of the U-bracket 126 to be varied to suit non-vertical or angled installations, including configurations where the mounting surface is curved, uneven, or constructed from a material other than metal, such as composite panels or glass substrates. The engagement between the slot 124 and the matching geometry of the U-bracket 126 remains fundamental to achieving secure mounting while maintaining full accessibility to wiring passages and serviceable subcomponents within the mounting end cap 117. The design, as exemplified, supports a broad range of deployment scenarios, from commercial and automotive lighting applications to architectural illumination where uniform, flexible, and robust mounting of linear LED elements is required.

Figure 8:
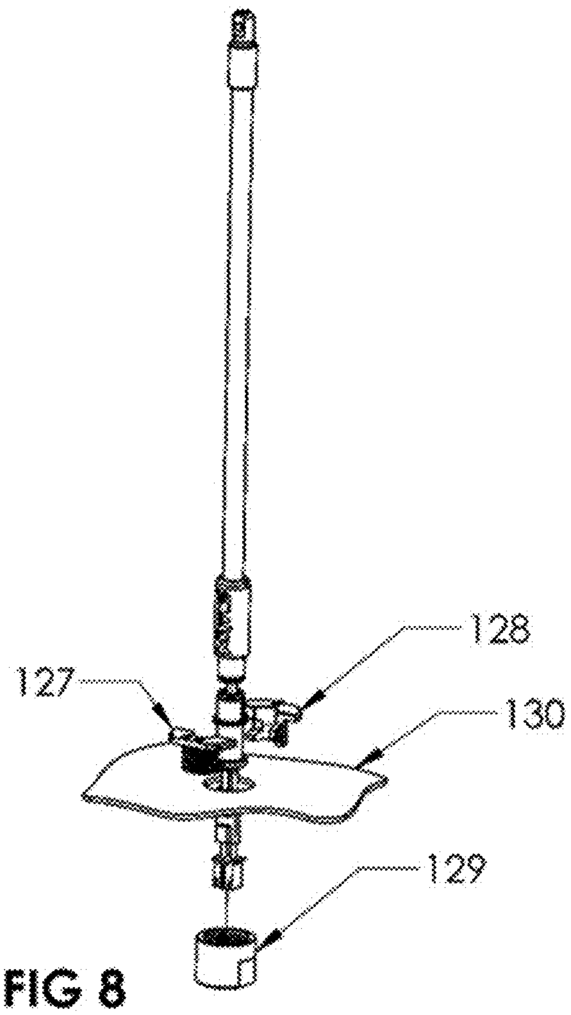
FIG. 8 illustrates a method for mounting the flexible linear LED lighting device to a horizontal surface using a nut, consistent with embodiments of the present invention.

FIG. 8 illustrates a method for mounting the flexible linear LED lighting device 100 to a horizontal surface using a split screw assembly comprising a first half 127 and a second half 128, a horizontal mounting panel 130, and a securing nut 129. The split screw halves 127 and 128 are designed to interlock within the slot 124 of the mounting end cap 117 (previously described), forming a unified threaded element concentrically aligned about the longitudinal axis of the flexible linear LED lighting device 100. The assembly is inserted through a prepared opening in the horizontal panel 130, with both halves 127 and 128 held in positional alignment such that their external combined threads extend below the underside of the mounting panel.

The external flanges on the split screw halves 127 and 128 are dimensioned so that, following insertion and engagement within slot 124, these flanges rest directly against the upper surface of the horizontal panel 130, providing axial support and distributing compressive load generated during installation. The length and thread profile of the united split screw assembly are engineered to permit the free passage of the device's power wires through the internal central bore of the mounting assembly, maintaining electrical isolation and preventing chafing during vibration or relative motion. Once the flexible linear LED lighting device 100, with its engaged split screw halves 127 and 128, occupies the correct orientation through the mounting panel 130, the nut 129 is threaded onto the protruding external threads beneath the panel 130.

Upon tightening, nut 129 exerts an upward force, clamping the split screw flanges securely against the panel 130 and rigidly locking the flexible linear LED lighting device 100 in the desired orthogonal position with respect to the horizontal surface. The design ensures that mechanical loads, including vibratory or impact forces, are transferred to the robust mounting end cap 117 and thence to the polycarbonate tube 106 rather than to the internal lighting assembly or electrical connections. The material selection for split screw halves 127 and 128, as well as the nut 129, may include engineering plastics for corrosion resistance, or metals such as stainless steel or brass for enhanced thread durability and mechanical strength. The geometry of the split screw permits easy removal and reinstallation, as each half can be disengaged from the slot 124 independently, further facilitating maintenance and modularity.

In one embodiment of the invention, the split screw halves 127 and 128 may comprise integral anti-rotation or alignment features such as interlocking keys or chamfers that engage corresponding detents within the slot 124 of the mounting end cap 117. This construction inhibits unintended loosening or rotation caused by vibration in dynamic environments. The surfaces contacting panel 130 may be textured or feature molded ridges to resist slippage or shift due to thermal cycling, impact, or user adjustment, supporting sustained positional accuracy of the installed device.

Additionally, in accordance with yet another embodiment, the nut 129 may incorporate a captive washer or elastomeric compression pad to further distribute clamping force over larger surface areas, enhancing resistance to loosening under cyclic loading and providing additional protection for delicate or non-metallic mounting panels. The internal bore of split screw halves 127 and 128 may integrate strain relief elements, such as flexible grommets, to support the passage of electrical conductors without risk of mechanical damage during installation, operation, or servicing.

Alternative embodiments of the present invention may scale the external thread size, pitch, or flange diameter of components 127 and 128 for compatibility with varying thicknesses or materials of horizontal panels 130 encountered in architectural, vehicular, or equipment applications. The mounting strategy depicted in FIG. 8 may also be adapted to permit installation into angled, recessed, or overhead structures, with corresponding changes to flange geometry or method of engagement with the slot 124 of mounting end cap 117. Such adaptations enable the flexible linear LED lighting device 100 to be reliably and precisely affixed in a plurality of orientations and substrates while preserving its defining properties of durability, flexibility, and consistent radial illumination.

A further embodiment may allow the split screw halves 127 and 128 to include through-holes or set screw provisions to facilitate grounding or electrical continuity with the mounting panel, if required for compliance with safety or electromagnetic compatibility standards. The mounting apparatus, as illustrated, supports rapid and robust installation, removable servicing, and a spectrum of use cases, providing a secure, non-permanent interface that enhances or even maximizes both the functional resilience and adaptability of the flexible linear LED lighting device 100 across diverse environments.

Figure 9:
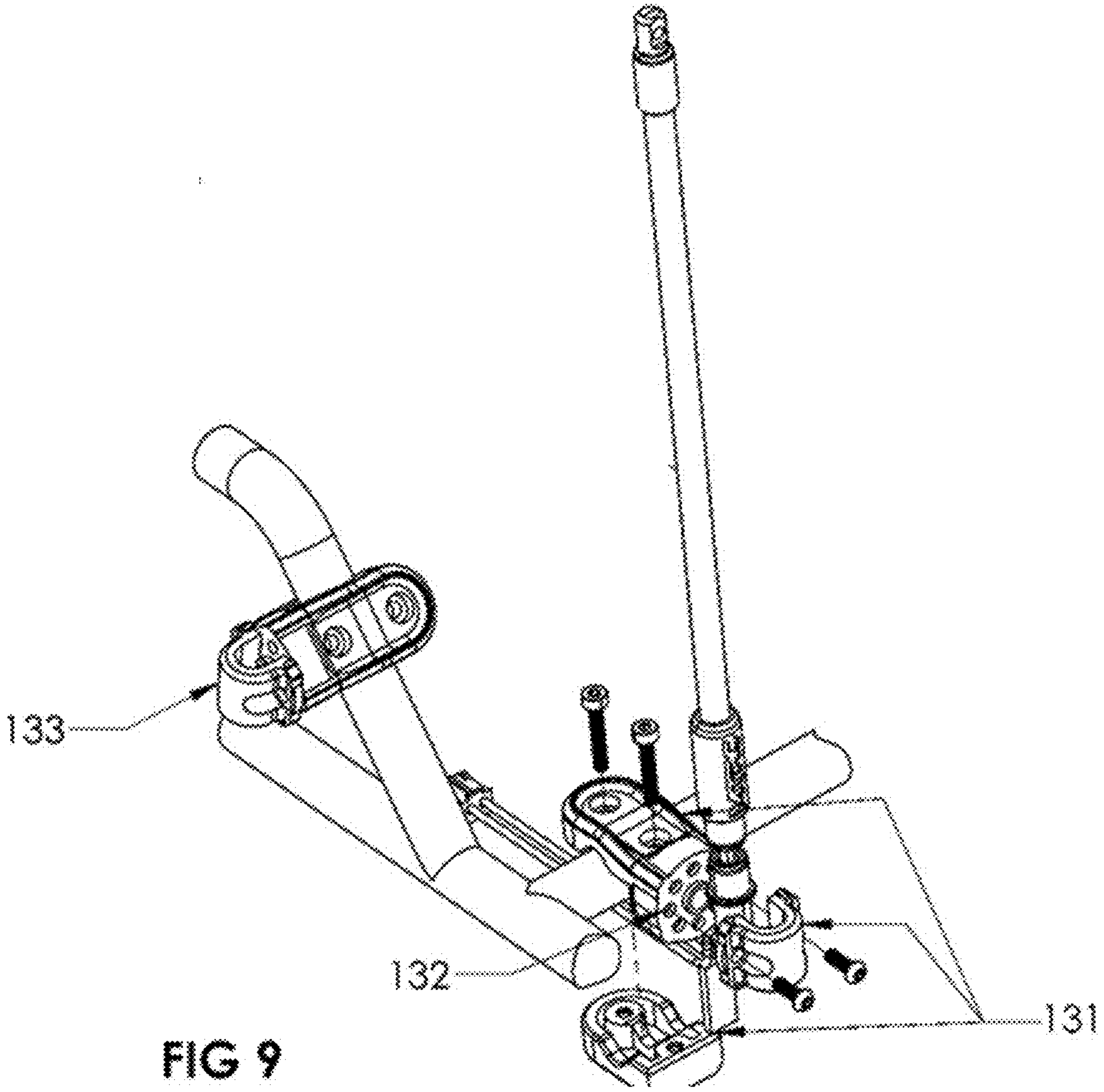
FIG. 9 illustrates a method for mounting the flexible linear LED lighting device to a round tube or bar using a roll bar mounting bracket, consistent with embodiments of the present invention.

FIG. 9 illustrates a mounting solution for attaching the flexible linear LED lighting device 100 to a round tube or bar using a roll bar mounting bracket assembly 131. The mounting bracket assembly 131 comprises multiple components, including an upper jaw, a lower jaw 132, and a U-bracket 133. The structural arrangement is designed such that the upper jaw and lower jaw 132 cooperate to clamp securely onto round tubes or bars of varying diameters, providing a stabilized interface for the fixture. The U-bracket 133 interfaces directly with the slot feature of the mounting end cap 117 (not shown in this figure but described in prior figures), establishing a secure mechanical connection between the flexible linear LED lighting device 100 and the mounting bracket 131. The bracket assembly is shown to utilize fasteners to draw the upper and lower jaws together, facilitating adjustability and robust retention about the circumference of the mounting structure.

The upper jaw of the mounting bracket assembly 131 is dimensioned to accommodate the curvature of the intended tube or bar, and its internal face may incorporate features such as grooves or a textured surface to increase friction and limit slippage once clamped. The lower jaw 132 aligns with the upper jaw through dedicated fastener passages, permitting one or more cap screws to draw the jaws together around the mounting substrate. The U-bracket 133 mates into the slot feature of the mounting end cap 117, providing a reliable point of attachment and further rigidity in the assembled state. This configuration enables the flexible linear LED lighting device 100 to be mounted orthogonal to or at various predetermined angles with respect to the long axis of the round tube or bar, depending on the slot orientation and jaw positioning.

In one embodiment of the invention, the roll bar mounting bracket assembly 131, including the upper jaw, lower jaw 132, and U-bracket 133, may be manufactured from high-strength engineering polymer, lightweight alloy, or stainless steel, each selected for their specific application needs such as resistance to vibration, mechanical impact, and environmental exposure. The assembly's fastener system employs machine screws or cap screws of standard metric or imperial sizes, which may be pre-installed or supplied as part of a mounting kit, contributing to fast and secure on-site installation. Ergonomic consideration of fastener head shapes and jaw profiles facilitates tool-assisted or manual assembly and disassembly.

Additionally, the lower jaw 132 can be adapted to accept mounting surfaces that are not perfectly circular, such as hexagonal or square profiles, through the inclusion of removable pads or expansion inserts, permitting the bracket assembly to be utilized on a plurality of supporting bars and rails. The arrangement of the jaws around the substrate ensures that mechanical loads encountered due to vibration, shock, or movement are dissipated across the major axis of the tube or bar, minimizing the risk of fatigue or deformation in either the bracket assembly or the mounted flexible linear LED lighting device 100.

In another embodiment of the present invention, the U-bracket 133 is designed with multiple screw holes to permit attachment at different locations along the slot of the mounting end cap 117 to support user-selectable device orientation. A circular hole pattern may be provided in the upper jaw to enable the flexible linear LED lighting device 100 to be set at angular orientations such as 45 degrees, 30 degrees, or 60 degrees with respect to the centerline of the mounting tube, according to specific lighting or aesthetic requirements. This adjustability is particularly advantageous in applications where directional illumination or signaling is required, such as on roll cages of radio-controlled vehicles or structural bars in architectural installations.

Further embodiments allow for the mounting bracket 131 to incorporate vibration-damping layers, such as elastomeric pads positioned between the jaws and the tube or bar, to reduce transferred mechanical resonances and prolong the operational lifespan of both the mounting assembly and the flexible linear LED lighting device 100. The U-bracket 133 may also be adapted to allow rapid release through the inclusion of spring-loaded or indexed locking systems, or constructed to remain permanently affixed for applications requiring heightened theft resistance or security.

Alternative variations of the device contemplate the use of additional components such as auxiliary bracing arms or anti-rotation keys to further stabilize the flexible linear LED lighting device 100 in environments subject to torsional or multi-axis loading. Modifications to the material composition, fastener types, and jaw geometries are encompassed within the scope of this invention, provided they enable stable, adjustable, and reliable mounting of the lighting device to round, square, or multi-faceted structural elements. The configuration as illustrated in FIG. 9 enables secure, adaptable installation of the flexible linear LED lighting device 100 in challenging mounting environments, thereby extending its utility across a broad range of commercial, vehicular, and industrial lighting applications.

Figure 10:
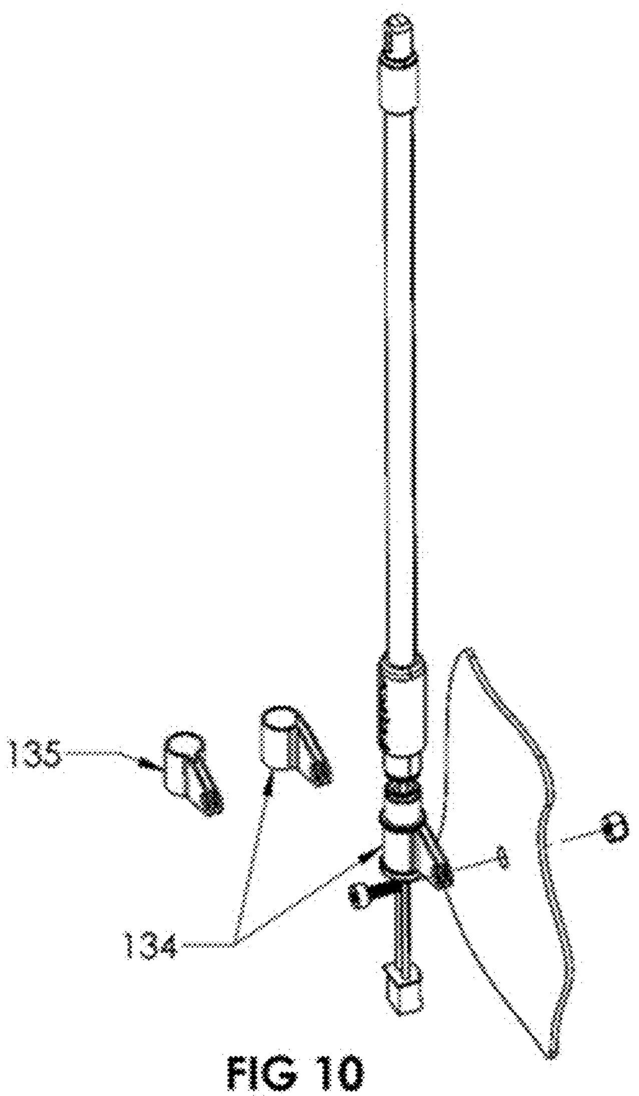
FIG. 10 illustrates a method for mounting the flexible linear LED lighting device to a vertical flat surface using metal or plastic P-clips and a center flange clip, consistent with embodiments of the present invention.

FIG. 10 illustrates a method for securing the flexible linear LED lighting device 100 to a vertical flat surface using mounting accessories, specifically metal or plastic P-clips 134 and a center flange clip 135. The linear LED assembly is depicted in conjunction with these mounting options, which are designed to physically retain the polycarbonate tube and central lighting assembly in a stable orientation relative to the supporting panel. The illustrated configuration provides for both single-point and distributed mounting along the longitudinal axis of the device, accommodating various requirements for retention force, orientation, and angular adjustability.

The P-clips 134 is shown as a generally U-shaped or semi-circular component configured to encircle and support the polycarbonate tube portion of the flexible linear LED lighting device 100. The P-clips 134 is secured to the vertical surface by passing a fastener, such as an M3 cap screw, through an aperture at one end of the clip and engaging it with a locking nut positioned behind the mounting panel. The internal surface of the P-clips 134 may be lined with an elastomeric insert or compression pad to increase friction, minimize abrasion, and adapt the component for secure engagement with the external diameter of the polycarbonate tube, enabling the device to be retained without deformation or damage.

The center flange clip 135 is represented as an alternative or supplemental mounting accessory that includes a contoured engagement zone shaped to cooperate with the profile of the polycarbonate tube and possibly spanning a larger surface area of the device. This clip may include an extended base flange or symmetrical side wings to increase torsional stability, and is likewise fastened to the vertical surface using standard machine screws and nuts. The interface between the center flange clips 135 and the polycarbonate tube is designed to maintain axial alignment and resist both lateral and rotational displacement, supporting the device's retention in installations where vibration or repeated external contact might otherwise loosen standard clips.

In one embodiment of the invention, the P-clips 134 and center flange clips 135 are manufactured from UV-stabilized polycarbonate, polyamide, or reinforced nylon for applications requiring high mechanical strength and environmental resistance. The use of stainless steel may be preferred for installations exposed to moisture or chemical corrosives, such as exterior automotive or marine environments. The dimensional tolerances of the clips are selected to permit a tight, slip-resistant interface with the polycarbonate tube, without exceeding the allowable compression limits of the tube wall material. The use of additional components such as washers or standoffs between the P-clip or center flange clip and the underlying support surface may further facilitate torque management, improved tightness resolution, or thermal isolation in high-performance deployments.

Additionally, spacers, standoffs, or multiple P-clips 134 can be strategically positioned along the length of the flexible linear LED lighting device 100, enabling distributed loading and enhanced compliance with curved, irregular, or composite vertical surfaces. This mounting method ensures that the device may be oriented at any desired rotational angle relative to the mounting panel, allowing the radial illumination profile to be targeted or adjusted as needed for visual emphasis, signaling, or aesthetic effect in display, signage, or architectural applications. The use of standard-sized fasteners, as depicted, ensures compatibility with both metal and non-metal substrate materials, supporting versatility in field installation and servicing.

In another embodiment of the present invention, the center flange clips 135 may be supplied with embedded vibration-damping features such as elastomeric inserts, foam pads, or resilient bushings molded into the clip body. These inserts can attenuate the transmission of mechanical shock or repetitive vibration from the mounting structure to the lighting device, thereby prolonging the operational life of both the polycarbonate tube and the internal layered assembly. The clip design may further accommodate through-holes or cable management features to enable routing and retention of power wiring along the mounting panel, supporting neat installation and compliance with relevant safety standards.

All described variations for P-clips 134 and center flange clips 135 can be scaled to match different tube diameters, wall thicknesses, and mounting substrate requirements. Use in combination with other accessory types, such as U-brackets or split clamp screws, may support complex mounting geometries or multi-axis orientation of the flexible linear LED lighting device 100. The described method allows the device to be readily removed or replaced for service while maintaining secure attachment in demanding operational environments, enhancing both the reliability and the flexible ability to deply the lighting system in diverse vertical mounting scenarios.

Figure 11:
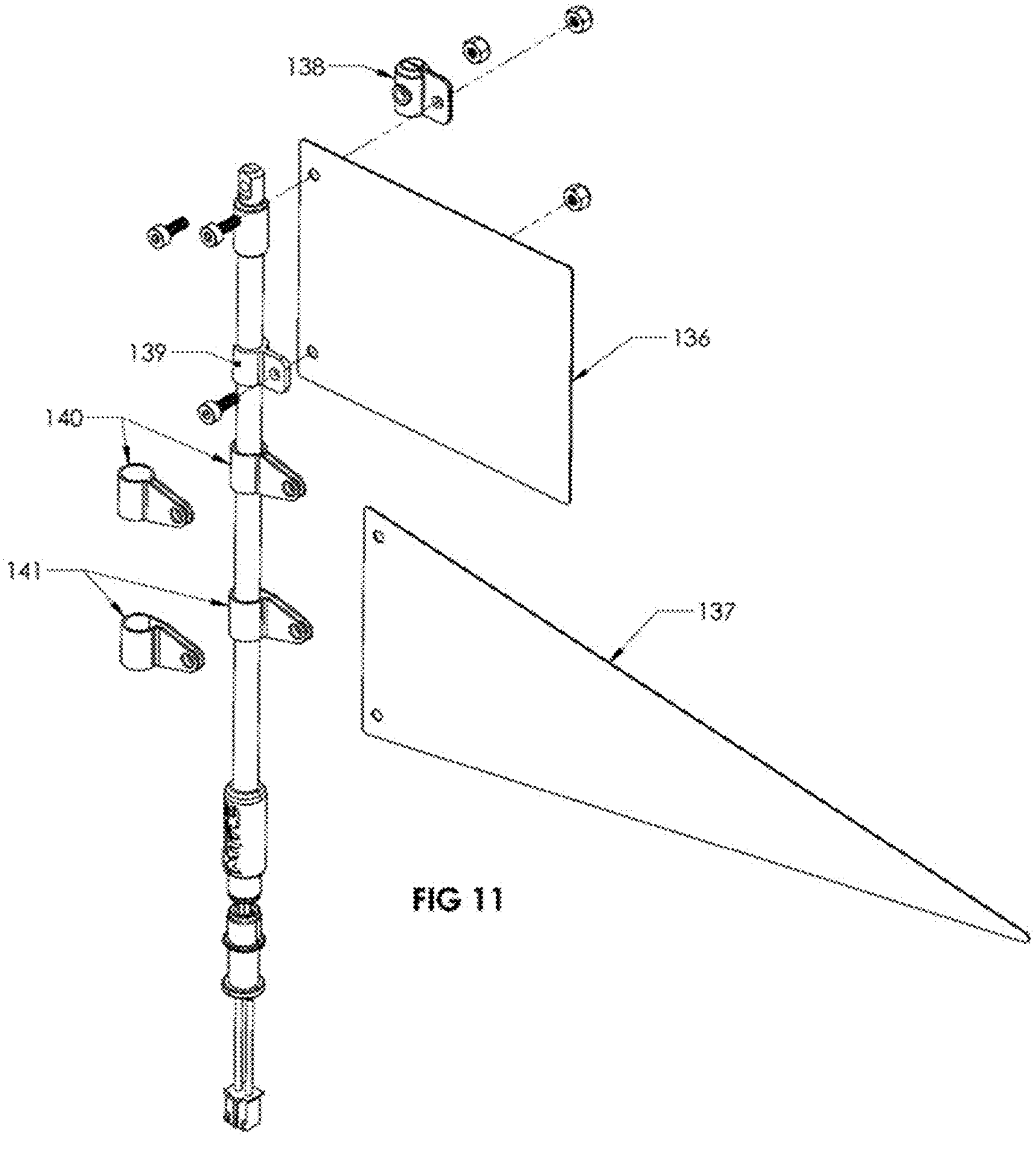
FIG. 11 illustrates options for attaching flags to the flexible linear LED lighting device, highlighting the lower portions of the flags, consistent with embodiments of the present invention.

FIG. 11 illustrates a range of configurations for attaching one or more flags 136 and 137 to the flexible linear LED lighting device 100, demonstrating an accessory mounting system that leverages both structural and frictional retention features integrated along the polycarbonate tube 106. The figure depicts two flag embodiments of differing dimensions, 136 and 137, in exploded relation to the lighting device 100, as well as the mechanical provision for securing these flags at both their upper and lower ends. Each flag 136 and 137 is fitted with mounting holes aligned to fasten with dedicated hardware through intermediary mounting components.

The upper end of flag 136 is shown attached at the tip of the flexible linear LED lighting device 100 via a flag mount cap 138, which is formed to match the outer profile of the device's distal end. The flag mount cap 138 provides a retention surface with a through-hole to accommodate the passage and affixation of an M2×10 mm screw and accompanying M2 locknut that transmits clamping force directly through the flag's mounting aperture. This configuration permits the upper portion of the flag to be secured in a substantially perpendicular orientation with respect to the illumination axis, while the flag mount cap itself is retained on the device via a corresponding fit or mechanical fastening to the underlying plastic endcap 114 of the linear LED lighting device 100.

Both flags 136 and 137 are stabilized along their lower margins by an array of mounting options. Illustrated is a flanged plastic C-clip 139 to snap tightly over the circumference of the polycarbonate tube 106, providing a frictional retention interface that resists axial sliding and rotational movement once pressed into place. The clip incorporates a boss or tab through which a secondary M2×10 mm screw and locknut pass, securing the lower flag aperture to the lighting device body, and promoting overall structural stability of the flag during motion or wind loading.

In one embodiment of the invention, the mounting configuration may additionally utilize a center flange clip 140, which comprises a larger surface engagement area as well as mounting features that can receive and stabilize oversized or specialty-shaped flags in applications demanding increased torsional resistance or distribution of wind loading. Furthermore, metal or plastic P-clips 141 are shown as alternates to C-clip 139, functioning similarly by encompassing the polycarbonate tube 106 and providing a mechanical interface for the flag's lower fastening. Such clips may be manufactured from high-strength polymers or corrosion-resistant metals, with internal surfaces contoured to closely match the tube's curvature and with integral or separate elastomeric padding for enhanced grip and vibration isolation.

Additionally, the flag mounting system, as shown, can accommodate flags 136 and 137 in a variety of shapes and sizes, with typical widths between 50 mm to 190 mm and lengths extending up to 250 mm. The mounting holes respective to the upper and lower portions of each flag are spaced to align with the interface points provided by the flag mount cap 138 and the chosen lower retention clips, thereby permitting standardized assembly regardless of flag shape. The modularity of this interface enables rapid swapping or replacement of flags in field conditions without specialist tools, supporting applications such as branding, numeric or alphanumeric identification, or decorative signaling.

In another embodiment of the invention, the flag mount cap 138 may include supplemental features such as integral gaskets for sealing against ingress of moisture or particulates at the distal tip of the polycarbonate tube 106, particularly beneficial for outdoor installations. The cap material may be selected for UV stability, low temperature flexibility, or other environmental requirements, ensuring continued securement of the flag during dynamic loading cycles. The lower C-clip 139 and alternative clips 140, 141 may be supplied as single-use, tamper-resistant, or quick-release variants, according to specific operational and deployment needs.

Further embodiments permit the arrangement and attachment hardware for the flags to be adapted or scaled, enabling the securement of multiple flags, banners, or pennants on a single flexible linear LED lighting device 100. The clips and caps may further provide accessory mounts, such as threaded inserts, D-loops, or eyelets for attachment of auxiliary signaling devices, reflectors, or beacons. This modular design supports a broad spectrum of field-configurable visual signaling or decorative requirements, maximizing the functionality of the core lighting device in both utilitarian and promotional applications.

Variations within the scope of the invention include the use of colored, patterned, or reflective flags, each mounted according to the depicted arrangement to extend the visibility, identification, or branding capabilities of the lighting device. The disclosed flag attachment methodology ensures that neither the structural nor optoelectronic integrity of the flexible linear LED lighting device 100 is compromised, as the mounting hardware interfaces exclusively with surface features engineered for accessory accommodation. The seamless integration of flags or other visual elements, as exemplified in FIG. 11, further broadens the potential operational environments for the invention, extending its application to public safety, recreational, commercial, and competitive vehicular uses.

Figure 12:
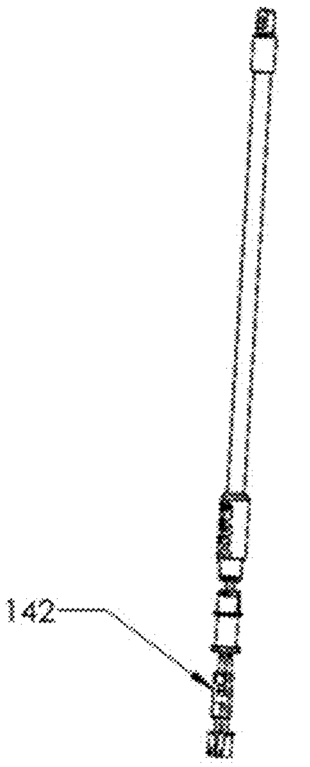
FIG. 12 illustrates an embodiment of the flexible linear LED lighting device wherein a DC-DC switching buck regulator is soldered inline along the device's input power wires, consistent with embodiments of the present invention.

FIG. 12 illustrates an embodiment of the flexible linear LED lighting device 100 in which a DC-DC switching buck regulator 142 is integrated along the input power wires 101 and 102. The buck regulator 142 is soldered in line with the power conductors, forming a subassembly that is affixed permanently to the input wiring path of the device. The spatial configuration as shown ensures that the buck regulator 142 is positioned proximal to the end of the lighting device where the power leads are introduced, allowing transformation of varying supply voltages down to the strict operating requirement of the COB LED string.

The DC-DC switching buck regulator 142 is electrically and mechanically connected between the incoming positive and negative input wires 101, 102, and the termination points of the flexible COB LED string within the main assembly. The buck regulator 142 has a printed circuit board in addition to associated components which are encased or otherwise encapsulated, in an embodiment, within aa protective over molded polymer sleeve, adhesive heat shrink tube or other protective layer to insulate and mechanically reinforce the subassembly against vibration, moisture ingress, or physical impact. The axial positioning of the buck regulator 142 along the power wiring is such that sufficient lead length is maintained both upstream for mating with standard power connectors and downstream for soldering to the COB LED substrate within the device body.

In one embodiment of the invention, the DC-DC switching buck regulator 142 is selected with a voltage input capability in the range of 4.0 VDC to 15 VDC, and output regulation precision tailored to deliver 3.0 VDC required by the flexible COB LED string. The integration of the buck regulator directly into the input lead permits installation of the lighting device across a spectrum of electrical systems, such as radio-controlled vehicles, display stands, or architectural lighting installations, where available voltage sources may substantially exceed the nominal voltage rating of the LEDs.

Additionally, the permanent affixation of the buck regulator 142 to the input wiring and within the device's proximal assembly envelope increases protection from environmental factors and mechanical stressors, compared to externally mounted or plug-in regulators. Such integration minimizes user error during installation and obviates the need for ancillary external voltage conversion components, thus streamlining the implementation of the lighting system in the field. The physical orientation and encapsulation of the buck regulator may be varied to accommodate different installation geometries or to enhance heat dissipation as required by specific application current demands.

In accordance with yet another embodiment, multiple variants of the switching regulator 142 with user-selectable output voltage options may be provisioned, supporting applications involving series or parallel-connected lighting devices of varying lengths or current requirements. Alternative configurations may incorporate advanced protection features, such as input overvoltage, output current-limiting, or thermal shutdown mechanisms, to further ensure reliable operation under adverse electrical conditions. The direct electrical continuity, robust physical encapsulation, and adaptive placement of the DC-DC switching buck regulator 142, as detailed in FIG. 12, serve to broaden the scope of compatible use environments and contribute to the core resilience and adaptability of the flexible linear LED lighting device 100 without compromising its uniform radial illumination or flexible installation properties.

Figure 13:
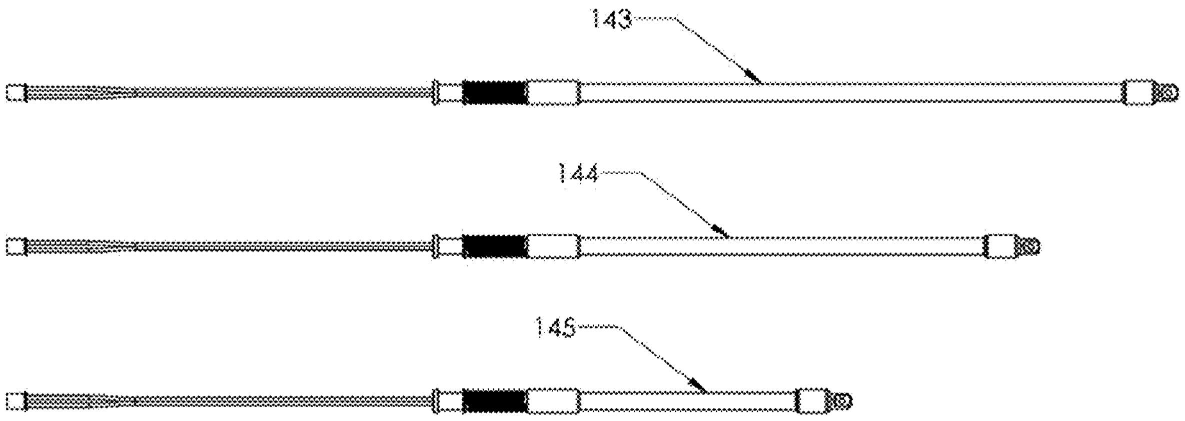
FIG. 13 illustrates multiple length options for the flexible linear LED lighting device, as shown in the provided examples, consistent with embodiments of the present invention.

FIG. 13 illustrates multiple length options for the flexible linear LED lighting device 100, specifically enumerated as reference numerals 143, 144, and 145. Each of these devices represents a different extended length of the visible, illuminated portion housed within the polycarbonate tube 106, thereby highlighting the adaptability of the invention to accommodate variable installation requirements and different operational scenarios. While sharing identical cross-sectional construction and functional principles, the devices 143, 144, and 145 are depicted to demonstrate possible variations in overall linear extent without deviation from the uniform radial illumination and flexible, resilient architecture central to the invention.

The physical structure of each lighting device 143, 144, and 145 features a polycarbonate tube 106 of distinct length, within which the core flexible COB LED string, tight-fitting polymer jacket 105, and associated electrical elements are proportionally extended or contracted. The external diameter, wall thickness, and material composition of the polycarbonate tube 106 for each length variant remain standardized, ensuring mechanical and optical performance consistency. The end cap interfaces, both at the input and distal ends, along with mounting structures such as the spring, base cap, and mounting base cap (not explicitly illustrated in this figure), are scaled or otherwise positioned to match the adjusted tube lengths.

In one embodiment of the invention, devices 143, 144, and 145 may have visible illuminated portions ranging from a compact 50 mm (device 145) to an extended 220 mm (device 143), supporting a wide spectrum of use cases from discreet accent lighting to large-scale signaling or display lighting. The length adjustment is achieved by correspondingly sizing the flexible COB LED string, the over-molded silicone encapsulation, and the conductive return wire 107, ensuring that both electronic continuity and light diffusion characteristics are preserved across all device lengths. The tight-fitting polymer jacket 105, likewise, is manufactured at matching lengths and retains its dual role as both a mechanical stiffener and optical diffuser across the device class.

Additionally, the adaptability to varying lengths allows for functional integration in mounting environments exhibiting space constraints or specialized geometry, such as narrow tubular mounts, elongated vehicle panels, or multi-device arrays on architectural features. Each length variant 143, 144, and 145 is fully compatible with the full suite of mounting hardware, flag accessories, and electrical interface components detailed in preceding figures and descriptions to facilitate modular deployment or user-driven customization without the need for bespoke fittings or electrical retuning. The axial continuity of light emission and resilience against bending impacts are maintained, regardless of linear extent, by preserving the multi-layered construction, clearances, and material specifications described for shorter or longer embodiments.

In another embodiment of the invention, differing lengths as demonstrated in FIG. 13 can be manufactured using automated laser cutting or extrusion processes for the polycarbonate tube 106 and tight-fitting polymer jacket 105, while the COB LED string is dimensioned through selective segmentation during substrate fabrication and LED mounting. The resulting assemblies exhibit identical strand counts, connections, and encapsulation materials at either end, supporting interchangeable use with standard connectors and mounting clips. Electrical parameters, such as operating current and power dissipation, may scale linearly or sublinearly with overall length; however, current regulation and heat management features, when necessary, can be engineered into the device architecture or upstream power supply.

Alternative embodiments also provide for intermediate or custom device lengths within the described 50 mm to 220 mm range, supporting batch production or on-demand customization for specialty applications. The proportional adjustment of all internal and external components illumination core, diffusing jackets, external rigid sleeves, electrical return paths, and end fittings, to ensure the continued realization of the invention's key attributes: ruggedness, uniform radial illumination, and omnidirectional flexibility. The full equivalence of construction and performance, irrespective of illuminated length, ensures comprehensive applicability of all claims to the range of devices represented in FIG. 13.

Figure 14:
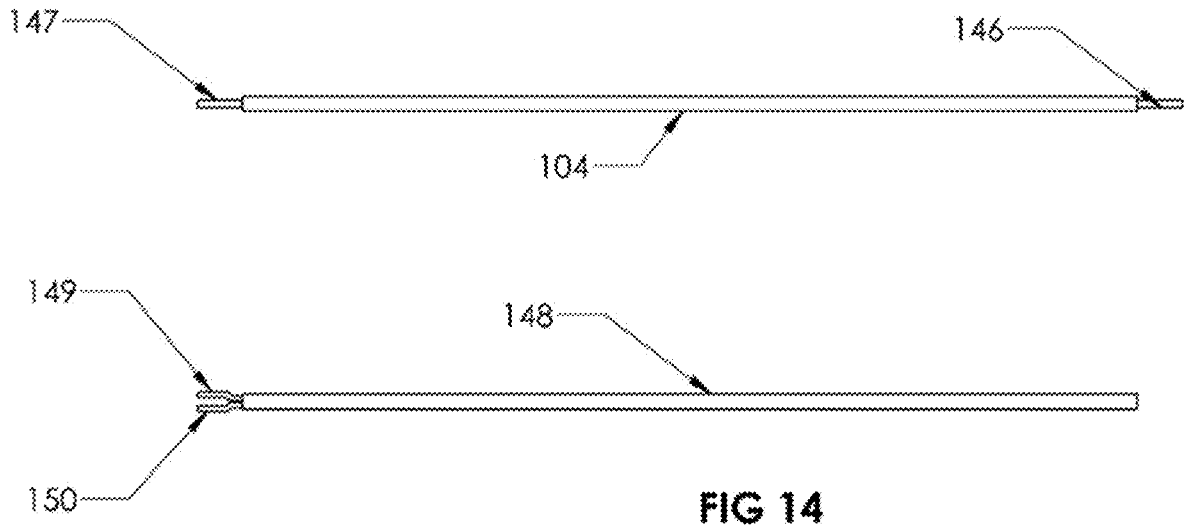
FIG. 14 illustrates another embodiment of the invention that employs a different type of COB LED string, featuring a negative terminal as disclosed, consistent with embodiments of the present invention.

FIG. 14 illustrates two alternate configurations of flexible COB LED strings that may be utilized as the central light-emitting element within the flexible linear LED lighting device 100. The upper depiction shows a COB LED string 104 with a positive terminal 147 and a negative terminal 146 positioned at opposite ends of the substrate, necessitating an external return path for electrical continuity along the lighting device's length. The lower depiction reveals an alternative COB LED string 148 wherein both positive terminal 149 and negative terminal 150 are collocated at a single end, thereby eliminating the requirement for an external return wire to traverse the length of the LED substrate.

The COB LED string 104, structured as a flexible, elongated assembly, is configured to support a single-ended connection scheme by means of the positive terminal 147 and negative terminal 146. In practical implementation, the negative terminal 146 is brought into electrical continuity with the input end of the device via a fine-gauge return wire 107, which runs parallel to the COB LED substrate. This architecture enables both voltage supply and return conductors to exit the device at one end, facilitating compact wiring harnessing and simplified integration with external power supplies or control circuitry. The flexible construction allows the COB LED string 104 to be embedded within the tight-fitting polymer jacket 105 and subsequently centered within the polycarbonate tube 106 as previously described, with the return wire 107 remaining discreetly retained along the inner length and optically masked to preserve the uniformity of emitted light.

In one embodiment of the invention, selection of a COB LED string 148 with both positive terminal 149 and negative terminal 150 co-located at a single substrate end further streamlines assembly by obviating the need for an auxiliary return conductor. Electrical return is accomplished through an internal routing within the COB LED string 148, where the negative track is laminated or otherwise integrated within the circuit structure of the flexible substrate itself. This modification retains all optical and mechanical properties necessary for the device's function, including compatibility with the tight-fitting polymer jacket 105 and polycarbonate tube 106, and maintains the lumen output and radial emission pattern across the visible length. Electrical connection is accomplished at the shared end using solder, crimp, or compression fittings to facilitate rapid manufacture and reliable connectivity, and reduce potential points of failure or manufacturing steps.

Additionally, the adoption of COB LED string 148 supports improved flexural performance, as the elimination of a discrete external return wire results in a fully monolithic, uniformly flexible lighting element. The absence of an additional longitudinal conductor reduces localized stiffening, further enhancing the device's bendability and ability to revert to the straight configuration after deformation. Optical uniformity is improved, as there is no risk of shadowing or light occlusion attributable to a superimposed metallic wire; the internal return path is organized such that it neither absorbs nor obstructs emitted photons, allowing increased efficiency and more consistent light diffusion.

In another embodiment of the present invention, both types of COB LED strings 104 with an external return wire 107 and 148 with an integrated internal return may be selectively implemented depending on cost, manufacturing preference, supply chain, or specific installation requirements. The selection does not alter the compatibility of the lighting device with other critical subassemblies such as the polymer jacket 105, rigid outer tube 106, mounting base caps, or the range of mounting accessories described in the preceding figures. The device remains capable of enduring repeated flexion, impact, and environmental exposure, as all mechanical and optical protective features remain unaltered by the internal circuit topology.

Alternative modifications may include COB LED strings supporting intermediate configurations, such as hybrid designs featuring both internal laminated return conductors and select points of external access, suitable for daisy-chaining multiple devices or for supporting advanced control protocols. Similarly, internal return path designs may be selected for specific current profiles, voltage drops, or mechanical flex-life characteristics, further tailoring the lighting device to various high-performance or specialty applications. The interchangeable use of COB LED strings 104 and 148 within the multi-layered, flexible, and resilient architecture of the device, as disclosed, ensures broad applicability and continued realization of uniform radial illumination, robust mechanical performance, and versatile mounting adaptability.

Electrical power is supplied to the device by engaging the input wiring 101 and 102 with the 2-pin JST connector 113 and subsequently connecting the assembly to an external power source. In embodiments featuring the integrated buck regulator 142, input voltage ranging from approximately 4.0 VDC to 15 VDC is stepped down to the regulated voltage required by the COB LED string 104. This method of operation ensures that, upon power application, the COB LED string 104 emits uniform radial illumination along the device's entire length. The regulated power supply, coupled with the device's multi-layered construction, enables repetitive bending and restoration to the default straight state without degradation of lighting performance, and provides a reliable method for continuous operation in demanding applications.

An embodiment of the present invention further provides for installation methods in which the device is secured to a variety of substrates by employing mounting hardware such as U Brackets 126, split screw assemblies 127 and 128, roll bar mounting brackets 131, or P-clips 134 and center flange clips 135. In such embodiments, the mechanical forces introduced during mounting or operation are absorbed by the stainless steel tension spring 115 and distributed along the flexible COB LED string 104 and its over-molded layers. The application of these mounting methods ensures that external loads are effectively managed, thereby preserving both the electrical connectivity and optical uniformity of the device, even during repeated cycles of flexing or impact.

With the present description in mind, below are some examples of certain embodiments illustratively complementing some of the methods and apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments contemplate a flexible linear lighting apparatus 100 comprising a flexible chip-on-board (COB) light-emitting diode (LED) string 104 formed on a flexible substrate, a polymer jacket 105 tightly enclosing the flexible COB LED string 104, and a rigid outer tube 106 positioned over the polymer jacket 105 with an axial clearance sufficient for free axial movement of the flexible COB LED string 104 and the polymer jacket 105 within the rigid outer cylindrical tube 106 during flexure of the flexible linear lighting apparatus 100. The flexible COB LED string 104 is configured to emit illumination radially through the polymer jacket 105 and the rigid outer tube 106.

The flexible linear lighting apparatus 100 further envisions the rigid outer tube 106 being cylindrical.

The flexible linear lighting apparatus 100 further imagines the polymer jacket 105 comprising a light-diffusing material configured to transmit at least 75 percent of light emitted from the flexible COB LED string 104.

The flexible linear lighting apparatus 100 further contemplates the polymer jacket 105 further enclosing an electrically conductive return wire 107 positioned alongside the flexible COB LED string 104 within the polymer jacket 105.

The flexible linear lighting apparatus 100 can further comprise a tension spring 115 positioned at a proximal end of the rigid outer tube 106, the tension spring 115 can be configured as a semi-rigid mechanical bridge between a base cap 112 and a mounting end cap 117. Another aspect of this envisions the tension spring 115 having an outer diameter between 7.0 mm and 9.0 mm and being configured to add flexion between the base cap 112 and a mounting end cap 117 to redistribute mechanical loads applied to the flexible linear lighting apparatus 100.

The flexible linear lighting apparatus 100 can further comprise a DC-DC buck regulator 142 electrically coupled in line with input wiring 101/102 to supply power to the flexible COB LED string 104, the DC-DC buck regulator 142 being configured to regulate input voltage within a range between 4.0 VDC to 15.0 VDC. This can further be wherein the DC-DC buck regulator 142 is encapsulated within a protective overmold directly along the input wiring 101/102.

The flexible linear lighting apparatus 100 further imagines the rigid outer tube 106 being a UV-stabilized polymer having a wall thickness between approximately 0.7 mm and 1.5 mm.

The flexible linear lighting apparatus 100 further contemplates the rigid outer tube 106 being a UV-stabilized polymer having a wall thickness between approximately 0.7 mm and 1.5 mm.

The flexible linear lighting apparatus 100 can further comprise a mounting end cap 117 formed with a slot-shaped feature 124 that is configured to engage with mounting hardware comprising U-brackets, flanged split screws, roll bar mounting brackets, and P-clips.

The flexible linear lighting apparatus 100 further envisions the COB LED string 104 being configured to bend around a radius of approximately 1 mm without mechanical failure or electrical discontinuity.

The flexible linear lighting apparatus 100 further considers the polymer jacket 105 and flexible COB LED string 104 being configured to return to a straight alignment within the rigid outer tube 106 after removal of external bending forces.

Yet another embodiment of the present invention shown in FIGS. 1-7 contemplate a linear lighting arrangement 100 comprising a flexible chip-on-board (COB) light-emitting diode (LED) string 104 formed on a flexible substrate, a polymer jacket 105 enclosing the flexible COB LED string 104, the polymer jacket 105 is light-diffusing, a rigid outer tube 106 positioned over the polymer jacket 105, the rigid outer tube 106 formed of a UV-stabilized polymer and configured to resist radial impact and abrasion, the rigid outer tube 106 extending from a proximal end to a free distal end, and a tension spring 115 positioned between a mounting end 117 of the linear lighting arrangement 100 and the proximal end, the tension spring 115 configured to act as a semi-rigid mechanical bridge between the mounting end 117 and rigid outer tube 106. The tension spring 115 is configured to absorb mechanical loads and enable flexure of the linear lighting arrangement 100 without permanent deformation of the flexible COB LED string 104 or the rigid outer tube 106.

The linear lighting arrangement 100 further envisions the rigid outer tube 106 comprising a polycarbonate material configured to provide optical transmittance, chemical resistance, and structural rigidity.

The linear lighting arrangement 100 further imagines the polymer jacket 105 having a wall thickness between approximately 0.1 mm and 0.3 mm.

The linear lighting arrangement 100 further contemplates the polymer jacket 105 comprising a thermoplastic elastomer having a hardness between approximately 40 Shore A and 70 Shore A.

The above sample embodiments should not be considered limiting to the scope of the invention whatsoever because many more embodiments and variations of embodiments are easily conceived within the teachings, scope of the instant specification.

An embodiment of the present invention provides marked advantages through its integrated configuration. The combination of regulated electrical input, multi-layered mechanical protection, and adaptable mounting arrangements yields a flexible linear LED lighting device that maintains uniform illumination, exhibits enhanced durability, and accommodates diverse installation environments. Such technical features enable the device to perform reliably in scenarios where repeated bending, abrasion, and impact are present, thereby overcoming limitations encountered in conventional linear LED solutions while broadening its applicability across a range of vehicular, display, and architectural applications.

Various modifications to these embodiments are evident to those skilled in the art based on the description and accompanying drawings. The principles associated with the various embodiments described herein can be applied to additional embodiments. Consequently, the description is not intended to be limited to the embodiments shown in conjunction with the accompanying drawings but aims to provide the broadest scope consistent with the principles and the innovative and inventive features disclosed or suggested herein. Therefore, the invention is expected to encompass all other such alternatives, modifications, and variations falling within the scope of the present invention and the appended claims.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the appended claims.

What is claimed is:

1. A flexible linear lighting apparatus comprising:
- a flexible chip-on-board (COB) light-emitting diode (LED) string formed on a flexible substrate;
- a polymer jacket tightly enclosing the flexible COB LED string;
- a rigid outer tube positioned over the polymer jacket with an axial clearance sufficient for free axial movement of the flexible COB LED string and the polymer jacket within the rigid outer cylindrical tube during flexure of the flexible linear lighting apparatus; and
- a tension spring positioned at a proximal end of the rigid outer tube, the tension spring configured as a semi-rigid mechanical bridge between a base cap and a mounting end cap,
- wherein the flexible COB LED string is configured to emit illumination radially through the polymer jacket and the rigid outer tube.

2. The flexible linear lighting apparatus of claim 1, wherein the rigid outer tube is cylindrical.

3. The flexible linear lighting apparatus of claim 1, wherein the polymer jacket comprises a light-diffusing material configured to transmit at least 75 percent of light emitted from the flexible COB LED string.

4. The flexible linear lighting apparatus of claim 1, wherein the polymer jacket further encloses an electrically conductive return wire positioned alongside the flexible COB LED string within the polymer jacket.

5. The flexible linear lighting apparatus of claim 1, wherein the tension spring has an outer diameter between 7.0 mm and 9.0 mm and is configured to add flexion between the base cap and a mounting end cap to redistribute mechanical loads applied to the flexible linear lighting apparatus.

6. The flexible linear lighting apparatus of claim 1 further comprising a DC-DC buck regulator electrically coupled in line with input wiring supplying power to the flexible COB LED string, the DC-DC buck regulator configured to regulate input voltage within a range between 4.0 VDC to 15.0 VDC.

7. The flexible linear lighting apparatus of claim 6, wherein the DC-DC buck regulator is encapsulated within a protective overmold directly along the input wiring.

8. The flexible linear lighting apparatus of claim 1, wherein the rigid outer tube is a UV-stabilized polymer having a wall thickness between approximately 0.7 mm and 1.5 mm.

9. The flexible linear lighting apparatus of claim 1, wherein the rigid outer tube is a UV-stabilized polymer having a wall thickness between approximately 0.7 mm and 1.5 mm.

10. The flexible linear lighting apparatus of claim 1 further comprising a mounting end cap formed with a slot-shaped feature configured to engage with mounting hardware comprising U-brackets, flanged split screws, roll bar mounting brackets, and P-clips.

11. The flexible linear lighting apparatus of claim 1, wherein the COB LED string is configured to bend around a radius of approximately 1 mm without mechanical failure or electrical discontinuity.

12. The flexible linear lighting apparatus of claim 1, wherein the polymer jacket and flexible COB LED string are configured to return to a straight alignment within the rigid outer tube after removal of external bending forces.

13. A linear lighting arrangement comprising:
- a flexible chip-on-board (COB) light-emitting diode (LED) string formed on a flexible substrate;
- a polymer jacket enclosing the flexible COB LED string, the polymer jacket is light-diffusing;
- a rigid outer tube positioned over the polymer jacket, the rigid outer tube formed of a UV-stabilized polymer and configured to resist radial impact and abrasion, the rigid outer tube extending from a proximal end to a free distal end;
- a tension spring positioned between a mounting end of the linear lighting arrangement and the proximal end, the tension spring configured to act as a semi-rigid mechanical bridge between the mounting end and rigid outer tube;
- the tension spring is configured to absorb mechanical loads and enable flexure of the linear lighting arrangement without permanent deformation of the flexible COB LED string or the rigid outer tube.

14. The linear lighting arrangement of claim 13, wherein the rigid outer tube comprises a polycarbonate material configured to provide optical transmittance, chemical resistance, and structural rigidity.

15. The linear lighting arrangement of claim 13, wherein the polymer jacket has a wall thickness between approximately 0.1 mm and 0.3 mm.

16. The linear lighting arrangement of claim 13, wherein the polymer jacket comprises a thermoplastic elastomer having a hardness between approximately 40 Shore A and 70 Shore A.

17. A flexible multi-layered linear light-emitting diode (LED) lighting device with uniform radial illumination, comprising:
- a flexible chip-on-board (COB) LED string comprising a plurality of closely spaced LEDs mounted on a clear flexible polymer substrate having a photo-etched copper cladding, wherein the flexible COB LED string is over-molded with a clear silicone coating;
- a polymer jacket tightly enveloping the flexible COB LED string and an associated thin-gauge electrical return wire, wherein the polymer jacket is formed from a light-diffusing material and configured to transmit at least 75 percent of light emitted from the LEDs;
- a rigid outer cylindrical sleeve formed from a UV-stabilized polymer material and positioned over the polymer jacket with a loose clearance, wherein the rigid outer cylindrical sleeve comprises an outer diameter and wall thickness selected to provide mechanical protection against abrasion and impact while permitting axial movement of the flexible COB LED string under external forces;
- a mounting assembly located at one longitudinal end of the flexible multi-layered linear LED lighting device and comprising a base cap electrically and mechanically coupled with the flexible COB LED string, and a stainless-steel tension spring having a predetermined outer diameter, length, and wire cross-section, the stainless-steel tension spring forming a semi-rigid mechanical bridge between the base cap and a mounting end cap;
- a set of input wiring comprising a pair of stranded wires for positive and negative voltage supply, and terminating at an input connector; and
- a DC-DC buck regulator electrically coupled in-line with the set of input wiring configured to step down an input voltage in a range from approximately 4.0 VDC to 15 VDC to a regulated voltage required by the flexible COB LED string.

18. The flexible multi-layered linear LED lighting device of claim 17, wherein the polymer jacket is formed from a white semi-transparent light-diffusing material configured to transmit between 65% to 90% of light emitted by the LEDs to produce a uniform radial glow.

19. The flexible multi-layered linear LED lighting device of claim 17, wherein the rigid outer cylindrical sleeve has a wall thickness of approximately 1 mm and an outer diameter of approximately 4.45 mm and is configured to maintain the axial centering of the flexible COB LED string while mitigating external mechanical impact.

* * * * *